(12) United States Patent
Cordova

(10) Patent No.: US 6,838,537 B2
(45) Date of Patent: Jan. 4, 2005

(54) TERPENE/CO-SOLVENT ADHESIVE OR PAINT COATING COMPOSITION FOR TOY ARTICLES

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/335,708

(22) Filed: Jan. 2, 2003

(65) Prior Publication Data

US 2004/0219299 A1 Nov. 4, 2004

Related U.S. Application Data

(62) Division of application No. 09/921,116, filed on Aug. 2, 2001, now Pat. No. 6,528,122.

(51) Int. Cl.[7] .................................................. B05D 3/00
(52) U.S. Cl. .................................................... 526/329.2
(58) Field of Search ....................................... 526/329.2

(56) References Cited

U.S. PATENT DOCUMENTS

| | | | |
|---|---|---|---|
| 4,833,193 A | * 5/1989 | Sieverding | ................... 524/480 |
| 5,362,316 A | 11/1994 | Paradise | ...................... 106/278 |
| 5,417,747 A | 5/1995 | Arata et al. | .................... 106/20 |
| 5,668,207 A | 9/1997 | Huang et al. | ................ 524/483 |
| 6,147,161 A | 11/2000 | Chao et al. | .................. 525/132 |
| 6,465,558 B2 * | 10/2002 | Scheibelhoffer et al. | .... 524/483 |
| 6,503,569 B2 * | 1/2003 | Sneddon | .................. 427/385.5 |

FOREIGN PATENT DOCUMENTS

| | | | |
|---|---|---|---|
| CN | 1261089 | * | 7/2000 |
| JP | 53-142471 | * | 12/1978 |
| JP | 10-219118 | * | 8/1998 |
| JP | 2002-220323 | * | 8/2002 |

* cited by examiner

*Primary Examiner*—Erma Cameron
(74) *Attorney, Agent, or Firm*—Robert W. Mulcahy

(57) ABSTRACT

The invention is directed to resin coating, adhesive, and cement compositions comprising styrenic copolymers and a solvent comprised of a terpene and certain high evaporation rate organic solvents. The high evaporation rate terpene co-solvents reduce the drying times of applied coatings and enhance the character of the ultimately applied coating in the formation of high adhesion bonding with molded elastomeric styrene copolymer surface substrates. The invention is also directed to a method of applying the instant coatings to substrate surfaces.

7 Claims, No Drawings

TERPENE/CO-SOLVENT ADHESIVE OR PAINT COATING COMPOSITION FOR TOY ARTICLES

This application is a Divisional Application of prior U.S. application Ser. No. 09/921,116 filed on Aug. 2, 2001 now U.S. Pat. No. 6,528,122.

BACKGROUND OF THE INVENTION

1. Field of the Invention

The present invention relates to a novel and improved coating composition and process for applying a styrenic based adhesive, cement, coating, or paint to thermoplastic polymer surfaces, particularly to toy articles formed of elastomeric materials. Because the coating composition uses naturally occurring terpene solvents and other high evaporation rate organic solvents, it is safe for use as a coating or paint for toy articles which can be safely used by children.

2. Description of the Related Art

Children's toys and dolls, in particular, have a history dating back into antiquity. Generally, the technology surrounding the manufacture of dolls centers on creation of an attractive doll face, miniturized application of conventional clothes, manufacture of a doll body using plush or other sculptural techniques, and the simulation of the hair with sculptural elements, fibers, or other techniques. In the case of doll faces, the doll maker has a wide panoply of possible constructions and manufacturing techniques at his disposal. Traditional techniques involve the use of plaster-like or hard plastics material to cast a doll face. In time, however, soft rubber materials such as styrene-butadiene rubber (SBR) and styrene-butadiene-styrene block copolymer (Kraton) elastomers have come to replace plaster and hard plastics in the production of doll heads because of their realistic look and feel.

The soft rubber doll faces include all the normal features of a human figure simulated by the doll including the entire head, including well formed lips, teeth, cheeks, nose, chin, ears, and forehead. After the injection molding of an elastomeric doll face, it is finished by applying a dye or other similar material to give the face a natural skin color. Parts of the facial skin are often given a contrasting reddish color to improve the attractiveness of the face, as by using an air brush may be used to apply a patch of rosy hue to the cheeks.

Regardless of the type of paint used on a toy doll article, it has remained imperative that such materials be safe for young children. Safety requirements have evolved through the years as safety concerns have grown. Generally, safety requirements mandate that any material compositions used in a toy be odorless, nonirritating to the skin or eyes or the like, and be nontoxic if ingested. Additional requirements have been expected of materials used to coat or paint toy articles in that they must be non-peeling, requiring that the coating or paint tenaciously adhere to the toy item to avoid flaking or peeling and possible consumption by a child user. Accordingly, such paints should be resistant to oxidation and flaking, particularly as applied to elastomeric rubber surfaces of soft doll faces. And further the paint should be able to withstand the stretching and other physical abuse of a child so that the appearance of the painted surface is maintained. And above all the paint or coating composition must avoid the use of undesirable volatile organic solvents the residual presence of which can be dangerous due to the toxic effect of certain aromatic and chlorinated hydrocarbon solvents.

In view of the environmental, health and safety concerns in the use of highly toxic organic solvents, less controversial solvents such as water or mineral spirits have been used to provide toy paint or coating compositions. The mineral spirits solvent is less toxic and considered generally safe in coating applications for toys and, of course, water is completely safe and non odiferous as a coating solvent for any coating applications. However both solvents evaporate relatively slowly over a long period of time which detracts from the overall effectiveness of these coating compositions. For example, when applying a water based latex emulsion paint to a soft elastomeric item, a slower evaporation time delays set up of the paint coating composition and inhibits complete bonding between the joined surfaces of the applied coat and the article. As a result of an extended drying period, non-uniform and unstable coatings result leaving these coating vulnerable to use factors which generate peeling and splitting among other negative consequnces.

As indicated above, the class of the styrenic elastomeric materials commonly used to mold doll faces and other toy articles are A-B-A type block polymers such as styrene-butadiene-butylene copolymer-styrene or styrene-butadiene-styrene, manufactured by Shell and sold under the trademark Kraton. The molded polymeric doll faces tend to be dull and unattractive and so are finished by application of a skin coating or paint to provide a good facial appearance to this facial piece. It has now been found that an elastomeric adhesive coating comprising a styrene based resin and a terpene solvent has particular advantages in forming tenaciously bonded adhesive coatings on styrenic resin molded items.

In copending commonly assigned U.S. patent application Ser. No. 09/729,071 (filed Dec. 4, 2000) to Sneddon there is provided a novel paint and adhesive coating composition comprising a styrenic copolymer and a terpene solvent. As described, this coating is particularly effective with styrenic containing elastomeric toy surfaces because of the solubilizing effect of the terpene on both the styrenic copolymer partner in the coating composition and the elastomeric styrenic substrate surface. Additionally, the terpene solvent is both quick drying and safe for usage as a coating ingredient for toy items.

While the styrenic copolymer/terpene solvent composition of the copending application is generally effective, certain challenges arise from its use. For example, in manufacturing environments the terpene solvents, while non-toxic, are odiferous (albeit pleasantly), and use of lesser amounts in coating compositions is desirable in confined manufacturing facilities. Additionally, the efficient throughput of toy manufacturing requires a high evaporation rate of any solvent used in the coating compositions to effect quick drying of a paint or adhesive coating on a substrate. In the case of terpenes, their evaporation rates are adequate but need improvement for greater throughput in the manufacture of painted toy articles. It has been further found that a terpene solvent such as d-limonene has an aggressive affinity for elatostomeric styrenic substrates which can be destructive to a skin substrate when a high concentration of terpene is employed in the coating. These concerns are met by the instant invention which provides for the use of certain co-solvents for the effective terpenes to form paint or adhesive compositions for toy articles which are safe, efficient, and effective when applied to elastomeric styrenic toy substrate surfaces.

SUMMARY OF THE INVENTION

In accordance with the present invention, there is provided an improved resin coating composition particularly useful for toy article applications comprising a styrenic copolymer and a solvent comprised of a terpene and certain other high evaporation rate organic co-solvents. The terpenes are naturally occuring, biodegradable compounds and, accordingly, they are considered safe as solvents for coating or paint applications for toy items. The terpene solvents have been found particularly effective in solubilizing styrenic copolymers and enhancing the bonding of the copolymers to form adhesive coatings on resinous substrate surfaces. However, that very advantageous solubilization feature results in the terpene solvent destructively attacking a styrenic substrate if too high a concentration of terpene is exposed to the styrenic surface for a prolonged period of time. The present invention addresses this problem by adding certain co-solvents to the terpene coating compositions to gain the coating advantages of using a terpene solvent to coat a styrenic coplymer substrate by lowering the concentration of the terpene and increasing the evaporation rate of the terpene/co-solvent coating compostion. In this manner the advantges of the terpene solvent can be achieved while reducing any risk of the terpene destructively attacking the styrenic copolymer substrate surface to which the coating is applied.

Specifically provided herein is a terpene/co-solvent mixture to overcome the terpene solvent difficulties cited above. The co-solvents to the terpenes are certain organic liguids which (1) have relatively high evaporation rates, (2) are capable of solubilizing styrenic copolymers, and (3) offer stability to the styrenic copolymer partner in the coating composition and in the elastomeric substrates to which they are applied in that the co-solvent is non-reactive with and non-destructive to the respective polymer materials. In the styrenic copolymer/terpene/co-solvent solution, the co-solvent acts to buffer the terpene solvent from oversolubilizing the styrenic copolymer and chemically breaking down the copolymer. Moreover, the high evaporation rate of these co-solvents causes the terpene/co-solvent coating mixture to evaporate at a higher rate than the terpene solvent used alone and thereby protecting the styrenic copolymer substrate to which the coating is applied from aggressive attack or overbonding by the terpene, most of which has been quickly co-vaporized in the drying process. These co-solvent qualities insure that the co-solvent enhances the evaporation rate of the coating composition and that the high evaporation rate organic solvent is driven completely from the ultimate coating during any drying steps. Therefore compositions made in accordance with the present invention are completely non-toxic, environmentally and child safe, and result in an overall superior coating or paint product.

High evaporation rate organic co-solvents within the purview of the present invention include isoprene, hexane, heptane, styrene liquid, xylene, toluene, methylcyclohexane, cyclohexane. 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, butyl acetate, propyl acetate, ethyl acetate, diethyl ether, dimethyl ether, diethylene glycol, 2-ethythexanol and mixtures thereof. The high evaporation rates of the instant co-solvents causes enhancement of evaporation of the terpene solvent partner and the organic co-solvent itself is completely driven off in a surface applied coating drying step.

The styrenic copolymer/terpene/co-solvent coating compositions made in accordance with the present invention dry in a rapid manner to enable a strong bond of the copolymer with polymeric substrate surfaces thereby engendering use durability to the applied coat or film. The terpene/co-solvent portion of the coating composition has been found capable of completely solubilizing styrene based resins, styrenic copolymers, pigments or other additives to provide a coating composition having a relatively high solids content up to 20% by weight of the total composition. Therefore while the resinous coating compositions made in accordance with the present invention can be viscous, they can be formulated to be poured and applied by hand, brush or other manipulative means for uniform coating application at ambient temperatures, while comprising a sufficient percentage of solids to avoid shrinkage following evaporation of the solvent.

The discovery of the present invention is that one may formulate a superior adhesive, cement, coating or paint composition by combining a styrenic copolymer and a solvent mixture of a terpene and certain co-solvents in certain amounts to form a coating composition of completely exceptional character when applied to elastomeric substrate surfaces. While the coating composition can be applied to any thermoplastic resin surface, the instant compositions are especially effective as a coating or adhesive for substrates comprised of styrene based elastomers, those copolymers with a linear A-B-A configuration in which A is a polystyrene endblock. It is believed that the terpene portion of the solvent mixture is particularly effective in solubilizing the styrene-based copolymer molecules of the substrate surface thereby takifying the elastomeric surface to generate a miscible interface with the applied coat resulting in an amalgam like bonding to the substrate upon drying. In the present coating composition, the co-solvent acts to temper the solubilizing effect of the terpene by diluting its influence in the coating solution and causing the terpenes to be more rapidly evaporated during drying of an applied coating. The terpene solvent portion of the solvent mixture has been found to be especially effective with styrene based elastomeric copolymer surfaces having unsaturated block segments such as styrene-ethylene-butylene-styrene (SEBS) surfaces. Consequently the resulting applied coatings herein are characterized by an exceptional durability, elongation and flexibility. Because the instant coating compositons employ naturally occuring terpene solvents and certain other high evaporation rate organic solvents, they are safe for use as paints for children's toys and are particularly useful in applications to the soft elastomeric materials used in doll facial structures where the paint coatings are expected to withstand the rigorous and hostile environment of child use.

The present invention is more particularly directed to a protective or adhesive coating composition for elastomeric substrates comprising from about 0.1% to 20% by weight of a styrenic copolymer resin and from 80% up to 99.9 weight % of solvent comprised of a terpene and an organic co-solvent disclosed herein. A preferred protective or ornamental paint coating composition comprises from about 0.5% to 5% of a styrenic resin selected from the group comprising styrene butadiene rubber (SBR), styrene-butadiene-styrene (S-B-S), and styrene-ethylene-butylene styrene (SEBS) elastomeric block copolymers and from 95 to 99.5 wt. % of the instant terpene/co-solvent mixture. The preferred terpene solvents in the instant coating compositions include a monoterpene or sesquiterpene. As already indicated., this coating composition has been found especially effective in application to styrenic surface subtrates and, particularly, the group comprising styrene butadiene rubber (SBR), styrene butadiene styrene., and styrene-ethylene-butylene-styrene elastomeric copolymer surfaces.

In yet another embodiment, the instant composition can be formulated as an adhesive or cement to act as a glue when applied to a styrenic elastomeric substrate. A cement, glue, or adhesive compositon comprises from about 5% to 10 wt % of the styrenic resin and from 90% to 95 wt % of the present terpene/co-solvent mixture. The application of this glue composition include the steps of (i) providing an elastomeric resin substrate surface; (ii) contacting the surface with an effective amount of a composition comprising from about 5% to 10.0% by weight of a styrenic copolymer resin and from 90.0 to 95 wt. % of a solvent comprised of the terpene/co-solvent mixture of the present invention; and (iii) curing the applied composition to form an adhesive layer on the elastomeric substrate. Any curing steps in the application of the coating compositions include any means (e.g. heating) for evaporating the terpene/co-solvent mixture or otherwise hardening an applied coating or film of the instant formulation to form a hardened or solid layer on a substrate surface.

DETAILED DESCRIPTION OF THE INVENTION

The present coating composition is the combination of three key ingredients, the styrene based copolymer and the solvent comprised of a terpene and a high evaporation rate organic co-solvent, which combination provides for the desirable properties of the instant invention recited above. The advantages of the instant composition are generated by the use of particular organic polymer solvents in combination with the terpene to enhance the application of polymer/terpene based coating compositions. In particular, the organic co-solvent used in combination with the terpene must possess (1) a high evaporation rate, (2) polymer solubilization charateristics, i.e. it must be capable of dissolving styrene based polymers and copolymers, and (3) styrene based stability, i.e. the solvent must be non-reactive with styrene based polymers so as to not chemically degrade them in solution or on a substrate containing styrene based polymers upon which the coating is to be applied. Co-solvents for terpene possessing these characteristics include isoprene, hexane, heptane, styrene liquid, xylene, toluene, methylcyclohexane, cyclohexane, 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, butyl acetate, propyl acetate, ethyl acetate, diethyl ether, dimethyl ether, diethylene glycol, 2-ethylhexanol and mixtures thereof. Preferred organic co-solvents for the terpene in the present coating composition comprise n-butyl acetate, methyl ethyl ketone, isopropanol, cyclohexanone, isophorone, and xylene. These preferred co-solvents of terpene have maximum compatibility with styrene base polymers and co-polymers and the terpene component of the solvent mixture.

The instant styrenic based coating compositions herein are primarily characterized by the presence of a terpene in an organic co-solvent mixture to provide a uniform composition for application to elastomeric substrates at ambient temperatures. As earlier indicated, terpene compounds that are suitable for this purpose include but are not limited to monoterpenes and sesquiterpene; the monoterpenes include pinashe, both the alpha and beta isomers; gamma terpinene; delta-3-carene; limonene, both the l and d isomers; methadiene; and dipentene (the racemic mixture of the isomers of optically active limonene) and mixtures thereof. A sesquiterpene compound used in the present invention is the general name for the compound having the formula $C_{15}H_{24}$. Examples of the sesquiterpene compounds within the purview of the present invention include cadinenes, caryophyllene, copaene, alpha-farnesene, humulene, longifolene, thujopsene and ylangene and mixtures thereof.

Preferred monoterpene and sesquiterpene solvents within the purview of the instant invention include d-limonene, l-limonene, dl-limonene, dipentene, terpineol, sesquiterpene, natural extracts such as lemon oil and orange oil containing the above-mentioned terpenes or mixtures thereof. Limonene is a natural product found in various ethereal oils such as oils of lemon, orange, caraway, dill and bergamot and which possesses a citrus-like odor and is found in commercial quantities in citrus fruits. Dipentene is found in large quantities in pine trees and has a distinct pine scent. Among all the listed terpenes, limonene in all forms is preferably used because it has a pleasant mild citrus scent, is color free and is found to enhance the coloring of paint coatings. Optimum coating composition results have been achieved with the isomer d-limonene. Terpene solvents in the practice of the present invention are available commercially from Arizona Chemical Company of Panama City, Fla. under the trademark ACINTENE "LS" series. It is contemplated that the terpene/cosolvent mixture may be further combined or blended with other safe solvents, such as mineral spirits, to lower the overall solvent emission or scent character of the composition and to facilitate early set up or curing following application of the coating or adhesive composition. Additionally, any other additive may be used to render the particular terpene satisfactory for use in a particular application. For example, deodorizing or perfuming agents can be used to temper the scent of odiferous terpenes such as pine scented dipentene and render the terpene as acceptable for toy coating application.

The total amount of terpene and co-solvent provided in the subject coating and adhesive compositions will vary depending on the character of the composition prepared, but will generally range from about 80.0% to 99.9 wt %, but preferably from about 90 to 99 wt % in the case of an adhesive or coating application contemplated herein. For application of a lay flat coating the terpene/co-solvent mixture is preferably present in an amount of from 95% to 99% by weight and as an adhesive or cement application the solvent is present in amounts of from 90.0% to 95% by weight of the total composition. The remainder of the composition comprises a styrenic resinous component in amounts ranging form about 0.1% to 20.0% by weight and preferably ranging from about 1% to 10.0% by weight of the total styrenic resin/terpene solvent composition. As indicated above, optional fillers, gellants, surfactants, pigments, dyes, perfuming agents and other additives may be included.

The resinous component of the present composition is a styrene based thermoplastic elastomer which include blends prepared by the copolymerization of one or more conjugated dienes, such as butadiene, isoprene, and chloroprene with styrene. Useful blends in the preparation of the instant coating and adhesive compositions include styrene butadiene rubber (SBR) and styrene-butadiene-styrene block copolymer. Styrene-based thermoplastic elastomers comprise blocks of hard segments, e.g., polystyrene, and blocks of soft segments, e.g. polyisoprene, polybutadiene, poly(ethylene-propylene), poly(ethylene-butylene), and polypropylene. Thus, useful styrene-based elastomers may comprise, for example, blocks of polystyrene and blocks of polyisoprene, or blocks of polystyrene and blocks of polybutadiene, of blocks of polystyrene and blocks of poly(ethylene-butylene). Examples of styrene based thermoelastic elastomers useful in the present composition, include styrene-ethylene-butylene-styrene block coplymers (e.g. KRATON G-1650, G-1651, G-1652, and G-1657) and styrene-ethylene-propylene block copolymers (e.g. KRATON G-1701, G-1702 and G-1762x), all commercially available from Shell Chemical Company. Combinations of these block copolymers can also be included. Styrene-ethylene-butylene-styrene (SEBS) copolymers are particularly effective because they have superior physical properties manifested in the coatings of the present invention, including durability in that it can withstand prolonged wear and tear in the form of impact resistence and flexibility. Again, the amount of thermoplastic elastomer useful in the present coating and adhesive compositions to achieve the desired characteristics is from about 0.1% to 20 wt % based on the total weight of the styrenic copolymer/terpene solvent composition. The compositional weights recited herein are based on the resin/co-solvent composition and inclusion of any additives will accordingly affect the overall compositional weight but the ratio of styrenic resin to terpene solvent will remain the same as initially formulated; that is, a 5% by weight styrenic resin in 95 wt % d-limonene/methyl ethyl ketone cosolvent mixture will remain in the same ration to one another even with the addition of dye or pigment.

It is to be emphasized that the purview of the compositional invention herein is the combination of a styrene based thermoplastic polymer and a terpene/co-solvent mixture in certain amounts for adhesion or paint application to elastomeric substrate surfaces. As indicated above, especially effective elastomers are styrene-ethylene-butylene-styrene (SEBS) copolymers which are solvated very effectively with a terpene such as d-limonene, the compatibility between the polymer and the terpene being speculated as being due to the mutual unsaturation in the terpene and the ethylene-butylene segment of the styrenic polymer. The particular compatibility of the terpene and and the SEBS polymer in the coating composition follows on through application to a solid molded or otherwise formed SEBS substrate surface, which acts as an optimal substrate surface for application of the SEBS/terpene (d-limonene) adhesive or paint coating composition. Accordingly, the most preferred embodiment of this invention is an application of an SEBS/terpene-cosolvent mixture coating to a solid molded SEBS substrate surface.

It is apparent that the coating solution may contain the same styrenic co-polymer as that material co-polymer in the substrate to be coated. In fact the solubilizing effects of the terpene/co-solvent on the styrenic copolymer in the coating composition encourages application of the coating to a similar or identical co-polymer substrate surface so that compatible adhesion takes place between the solubilized co-polymer in the coating solution and that co-polymer materials in the substrate to which the coating is to be applied. An application of the subject protective or adhesive coating include the steps of (i) providing an elastomeric resin substrate; (ii) applying a composition comprising from about 0.1% to 20.0% by weight of a styrenic copolymer resin and from 80.0% to 99.9 wt. % of the instant terpene/co-solvent mixture to the elastomeric substrate; and (iii) curing the applied composition to form a layer on the elastomeric substrate.

The terpene/organic co-solvent mixture of the present invention can generally be employed in any ratio of the terpene to the high evaporation rate co-solvent but preferably the terpene is used in lesser quantities than the high evaporation organic solvent. As the majority solvent, the high evaporation co-solvent further enhances the evaporation of the solvent mixture in the coating composition during any coating drying step and the co-solvent completely driven off from the coating applied surface.

The coatings and adhesive compositions herein are characterized by viscosities approaching that of ordinary paint or the more viscous glue formulations. A dried coat of the instant formulations have elongation values and adhesion characteristics conforming to the quality and safety standards necessary for application to toy products. In addition, these coatings or adhesives have ultimate tensile values of greater than about 500 psi indicating that toughness is not being sacrificed to flexibility in the use of these coating compositions. It is important that coatings or adhesives used for application to toy articles, such as a soft elastomeric doll facial element, have high tensile strength so that the coated or painted article have child use durability especially as to stretchability. The instant coating and adhesive compositions have flexibility at both ambient and cold temperatures.

Paint application equipment constrains good application of coatings with viscosities that are greater than average paint and surface coating formulations and, accordingly, the viscosity of the instant compositions for a paint or film coating application have to be controlled by keeping a proper ratio of styrenic resin to the terpene/co-solvent mixture. Stringing, nozzle clogging, and inconsistent or poor coating application occurs at high viscosities. A combination of high percent elongation, high adhesion, and low modulus in the instant compositions are shown to have good correlation with excellent lay flat characteristics in a finish coated elastomeric article. The resultant properties of the instant coating and adhesive compositions make them ideally suited for toy paint applications especially where good lay flat character is required.

The instant coating may be applied as a paint and accordingly the composition would contain a pigment, dye, or colorant in amounts of up to 3% by weight in addition to the thermoplastic elastomeric resin and terpene solvent. The pigment used herein is not particularly limited and various inorganic or organic pigments can be employed. Concrete examples of pigments and colorants are: synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; and tetra-chloro-zincate sold by the Day Glow Corporation.

In reinforcement of the additives mentioned above, compositions made in accordance with the present invention may additionally employ gelling and thickening agents such as ethylene glycol and clay mixtures to provide the desired texture and body for ease of application of the instant coating compositions. In certain coating applications, fillers and stabilizers such as organic and inorganic fibers, sand, talc and mixtures thereof may also be included as part of the coating composition. Compositions of the present invention can be applied by any means such as with a brush, a cloth, or a spray applicator. The surface of a polymeric substrate surface should be clean and dry before application of the instant coating. Once applied the compositions should be allowed a sufficient period to allow curing of the composition by drying of the terpene/co-solvent.

Having generally described the present invention, the following examples are set for the below to further demonstrate compositions embodying the present invention. The compositions of the present invention are prepared by adding the specified amount of styrenic resin to the stated amount of terpene/co-solvent mixture under agitaiton. Specified amounts of other ingredients are added where indicated. In the following Example 1, the applied paint composition is subjected to an Eraser Abrasion Test, a Surface Coating Adhesion (Tape Pull) Test, and Stretch Tests to determine the adhesion and stretch characteristics of the present styrenic copolymer/terpene coating composition. These tests are carried out employing standard Quality and Safety Operating Procedures of the Assignee of the present application, Mattel, Inc.

EXAMPLE 1

4 percent by weight of a styrene-ethylene-butylene-styrene (SEBS) copolymer elastomer known as Kraton 1650 is dissolved in a 95 percent by weight of a d-Limonene/n-butyl acetate/methyl ethyl ketone cosolvent mixture (in a 20/30/50 volume ratio) in a flask. After complete disolution of the styrenic elastomer the viscosity of the solution is slightly greater than water. 1% by weight of a red pigment was added to the paint coating solution with stirring continued until dispersion of the pigment and generation of a red color to the coating (paint) composition. A molded soft elastomeric doll face comprised of a solid molded SEBS elastomeric copolymer was provided and the paint composition applied to the cheek and lip areas of the molded doll face. The rubbery painted doll facial item was allowed to dry for 3 minutes. Thereafter the soft painted rubbery painted doll face was subjected to 1600% Elongation Test and an Eraser Abrasion Test. The tests revealed that the paint coating did not split, peel, or abrade under the tests. The surface bonding between the applied coating and the surface substrate was so strong and uniform so as cause complete adhesion between the styrenic coating and the rubbery elastomeric substrate surface.

EXAMPLE 2

95 percent by weight of the same styrenic thermoplastic elastomer of Example 1 (Kraton 1650) was dissolved in a 4 percent by weight volume of a d-Limonene/xylene/toluene solvent mixture in a wide mouth beaker. After complete disolution of the styrenic thermoplastic elastomer with difficult stirring the viscosity of the solution was approximate that of a thick glue. Thereafter a rubbery styrenic copolymer substrate surface is provided and a dab of the viscous elastomeric terpene/cosolvent solution is applied to the rubber surface and as separate piece of rubbery material patched onto the dabbed viscous area. After drying for an hour the patched rubber item was found glued tenaciously to the thermoplastic elastomeric substrate surface without any damage to the surface. Attempts at removal of the patch results in damage to the elastomeric substrate surface because of the tearing action.

The adhesive and coating compositions of the present invention possess unique combinations of properties, including both a high degree of elastic durability under suddenly applied stresses, and a high degree of plasticity when the stress is applied more slowly. The miscible character of the styrenic polymer/terpene/co-solvent composition when applied to a molded polystyrene endblocked polymer substrate surface causes an anneal like bonding with that substrate surface so as to form a physically indistinguishable layer with that surface. Accordingly the well bonded compositional layer reacts to the physical stresses applied to the body of the substrate in exactly the same manner as the underlying substrate. Therefore the coating will stretch, strain, and impact as its substrate underlayer and show no splitting or peeling. Other properties include excellent stability throughout a very wide temperature range as well as a relatively pleasant odor character to the coating due to the very small amounts of terpene solvent remaining (in parts per million ("PPM")). Most importantly, the applied coatings of these novel compositions are nontoxic and, therefore, coated toy items are safe for use by children of all ages.

Having thus described the principals of the invention, together with illustrative embodiment thereof, it is to be understood that although specific terms are employed, they are used in a generic and descriptive sense and not for the purpose of limitation, the scope of the invention being set forth in the following claims.

What is claimed:

1. A coating composition comprising from about 0.5% to 5% by weight of a styrenic copolymer resin selected from the group consisting of styrene butadiene rubber, styrene butadiene styrene, and styrene-ethylene-butylene-styrene copolymer and from 95 to 99.5% of a monoterpene/organic co-solvent mixture, the organic co-solvent being selected from the group consisting of isoprene, hexane, heptane, styrene liquid, xylene, toluene, methylcyclohexane, cyclohexane, 2,2-dichloropropane, methylene chloride, diisobutyl ketone, diisopropylketone, methyl isobutyl ketone, methyl isopropyl ketone, methyl cyclohexanone, cyclohexanone, isobutyl acetate, isopropyl acetate, n-butyl acetate, propyl acetate, ethyl acetate, diethyl ether, dimethyl ether, diethylene glycol, 2-ethylhexanol and mixtures thereof.

2. The composition of claim 1 wherein the monoterpene solvent is selected from the group consisting of d-limonene, l-limonene, dl-limonene, dipentene, alpha and beta pinashe, gamma terpinene; and delta-3-carene.

3. The composition of claim 2 wherein the monoterpene solvent is d-limonene.

4. The composition of claim 2 wherein the monoterpene solvent is l-limonene.

5. The composition of claim 2 wherein the monoterpene solvent is dl-limonene.

6. The composition of claim 2 wherein the monoterpene solvent is dipentene.

7. The composition of claim 2, wherein the organic co-solvent is a mixture of n-butyl acetate and methyl ethyl ketone.

\* \* \* \* \*